United States Patent [19]
Grove

[11] 3,752,955
[45] Aug. 14, 1973

[54] ELECTRIC OVEN TOASTER CONTROL MECHANISM

[75] Inventor: Lawrence L. Grove, Allentown, Pa.

[73] Assignee: General Electric Company, Bridgeport, Conn.

[22] Filed: Jan. 19, 1973

[21] Appl. No.: 325,103

[52] U.S. Cl............ 219/413, 99/329, 99/389, 219/489, 219/494, 219/521
[51] Int. Cl............ F27d 11/02, A21b 3/02
[58] Field of Search............ 219/405, 413, 489, 219/494, 521; 99/329, 331, 341, 389, 393

[56] References Cited
UNITED STATES PATENTS

| | | | |
|---|---|---|---|
| 2,266,301 | 12/1941 | Biebel | 99/331 |
| 3,119,000 | 1/1964 | Loch et al. | 219/413 |
| 3,119,001 | 1/1964 | Andrews | 219/413 |
| 3,585,360 | 6/1971 | Young et al. | 219/405 |
| 3,660,637 | 5/1972 | Grove | 219/413 |
| 3,669,004 | 6/1972 | Eaton et al. | 99/331 |
| 3,684,860 | 8/1972 | Snyder | 219/413 |
| 3,684,861 | 8/1972 | DeRemer | 219/413 |

*Primary Examiner*—Volodymyr Y. Mayewsky
*Attorney*—George R. Powers, Leonard J. Platt et al.

[57] ABSTRACT

An electric oven toaster control mechanism wherein a unique lever and solenoid mechanism is arranged for cooperation with a main switch and an oven toaster door for permitting the switch to be closed when the door is closed and for allowing the solenoid to open the main switch at the end of a toasting cycle. A solenoid core is connected to an arm of a movable latch member for pivoting the latch member at the end of a toasting cycle to open a main switch. A spring urged door lever operates on the solenoid core and the arm of the latch member for preventing closure of the main switch when the oven toaster door is open.

11 Claims, 8 Drawing Figures

PATENTED AUG 14 1973

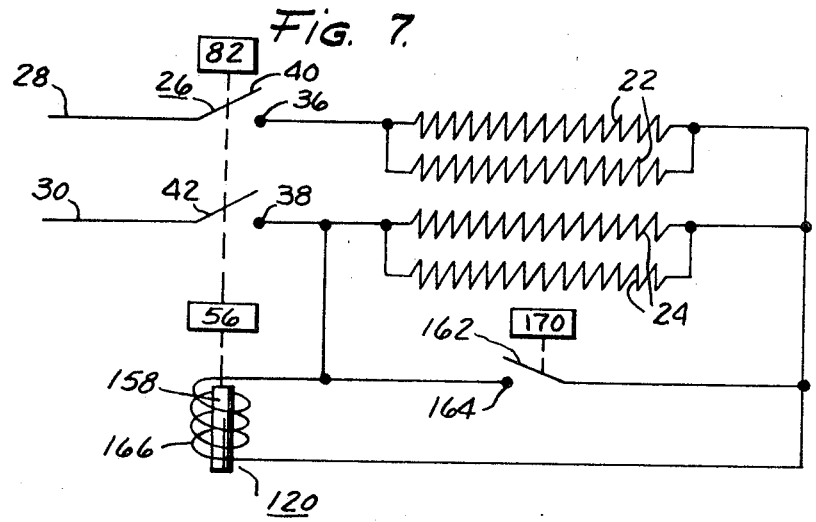
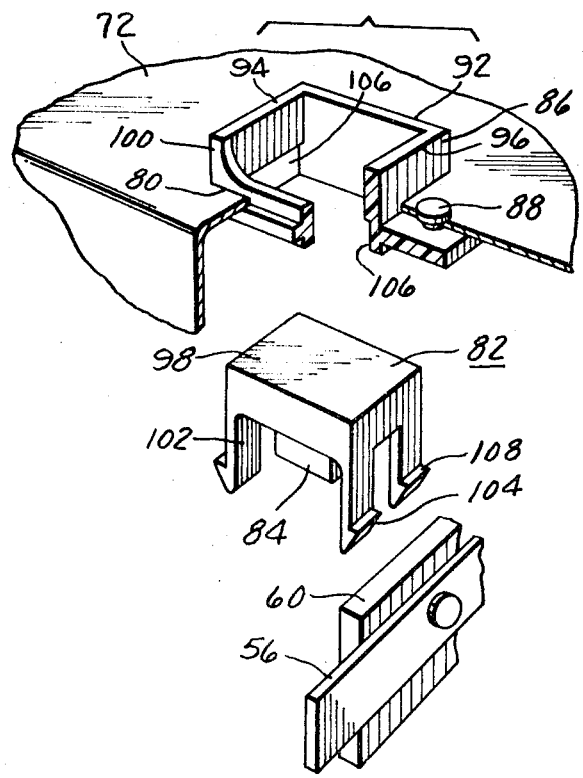
Fig. 7.
Fig. 8.

ELECTRIC OVEN TOASTER CONTROL MECHANISM

BACKGROUND OF THE INVENTION

This invention relates to an electric oven toaster of the type which may be used to toast bread or cook convenience foods such as frozen pizzas and TV dinners, and more particularly to a simplified control mechanism for such an oven toaster.

In a prior U.S. Pat. No. 3,119,000 to J. P. Loch et al., assigned to the same assignee as the present invention there is disclosed an arrangement for controlling operation of an oven toaster. The controls are arranged along the lower front of the oven toaster and a door is positioned above the controls for permitting access to the cooking chamber. A heat responsive control member 98 is positioned within the cooking chamber for sensing the temperature of the food being cooked so that the door may be automatically opened at the end of a cooking cycle by the control mechanism. The controls include a bimetal actuator 51 which is energized at the end of a cooking cycle to move a latch lever 86 which in turn actuates a lever 71 to automatically open the door, and the lever 71 in turn operates a latch lever 66 to open the main switch 46 at the end of a toasting period. This invention is concerned with such an oven toaster and more particularly to an improved simplified control mechanism which does not allow the oven toaster door to be automatically open at the end of a cooking cycle, but is nevertheless interrelated with the door for allowing a main switch to be closed to energize the heating elements of such an oven toaster only when the door is in its closed position.

Accordingly, it is a particular object of my invention to provide an improved control mechanism for an oven toaster. It is another object of my invention to provide an improved low cost control mechanism for an electric oven toaster having relatively few parts which may be easily manufactured and assembled to each other to reliably control operation of an oven toaster.

SUMMARY OF THE INVENTION

In accordance with one of the aspects of this invention an electric oven toaster includes a cooking chamber having a front opening and a door for closing the front opening. A horizontal food supporting rack and electric heating elements are mounted within the chamber. A switch having contacts which are normally urged to their open position is connected in series circuit relationship with the heating elements for energizing the heating elements when the switch is closed. A switch operating arm is provided for moving the switch to its closed position and a movable member having a latch surface is provided for holding the switch arm in its switch closed position. A solenoid is provided with a core member directly connected to the movable member with the latch surface for directly moving the movable member at the end of a cooking cycle to open the main switch. A control means is provided for suitably determining the cooking period and a switch is arranged in circuit relationship with the solenoid and operably connected to the control means for energizing the solenoid upon movement of the control means at the end of a cooking period. Thus, at the end of a cooking time interval the solenoid switch energizes the solenoid to permit the solenoid core to directly release the latch to open the main switch.

With this construction the solenoid directly operates the latch for the main switch, and a lever mechanism between the door and the main switch may be accomplished by the use of relatively few parts which are readily combined with each other. Thus, an exceedingly simple, reliable, oven toaster control has been achieved.

BRIEF DESCRIPTION OF THE DRAWING

Other objects and attendant advantages of the invention will be apparent from the following description taken in connection with the accompanying drawing in which:

FIG. 7 is a circuit diagram of the oven toaster; and

FIG. 8 is a fragmentary exploded perspective view of my unique push button and guide construction.

DESCRIPTION OF THE PREFERRED EMBODIMENT

Figure 1:
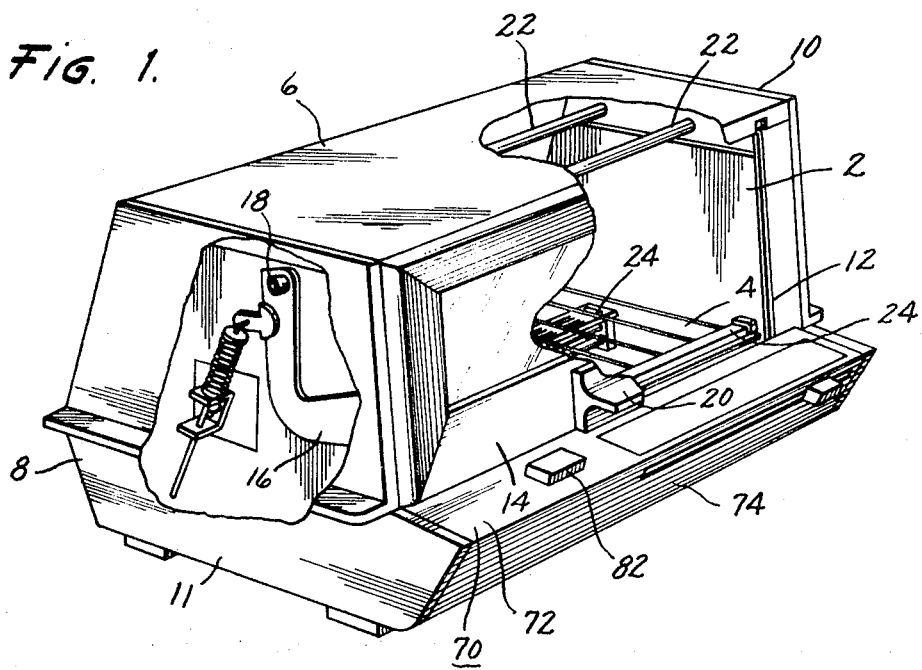
FIG. 1 is a front perspective view of an electric oven toaster control embodying my invention partially broken away to show details of construction.

Referring now to the drawing and first particularly to FIG. 1, there is shown an electric oven toaster which includes a toasting and oven chamber 2 in which is mounted a generally horizontal rack 4 for holding food to be cooking or bread to be toasted. The oven toaster includes a generally horizontal top wall 6, generally parallel vertical side walls 8 and 10, a bottom wall 11, and a front opening 12 to provide access to the inside of the oven toaster.

A front door 14 is provided for closing the front opening 12, and as shown more particularly in FIG. 1, the door is connected to a pair of door support arms 16 which are pivotally mounted at 18 for enabling the door to be lifted by a handle 20 from its closed position illustrated in FIG. 1 to an upper open position. The details of the door arm and hinge mechanism do not form a part of this invention and are described and illustrated in greater detail in a co-pending application of Paul V. Snyder and Willard F. Schultz, Ser. No. 325,104, filed Jan. 19, 1973, and assigned to the same assignee as the present invention.

Figure 3:
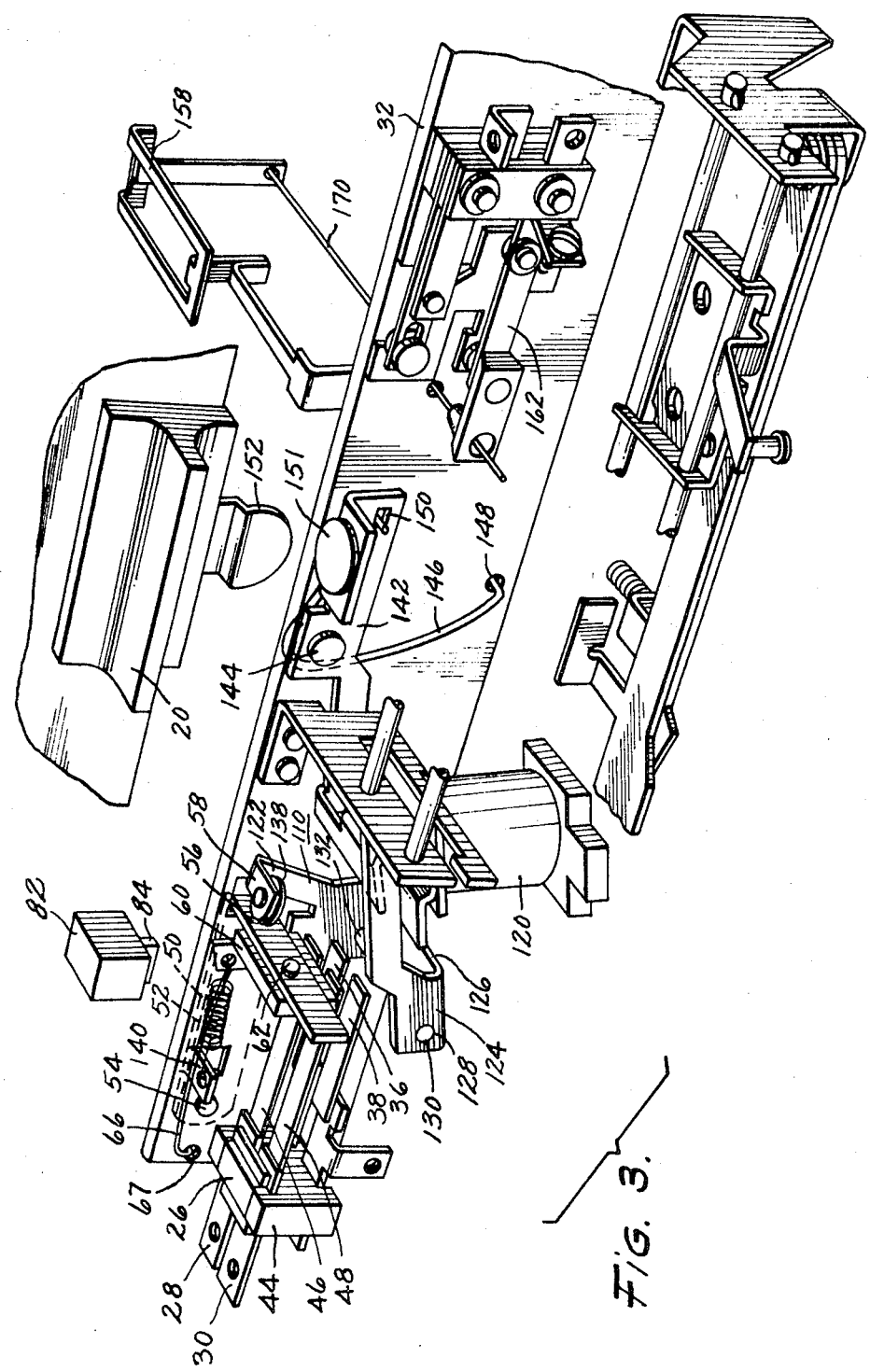
FIG. 3 is generally similar to FIG. 2 but shows additional parts of the control mechanism including a heat responsive control means for actuating a solenoid switch at the end of a toasting time period.

Mounted within cooking chamber 2 adjacent top wall 6 are a pair of electric heating elements 22, and another pair of electric heating elements 24 are mounted adjacent bottom wall 11. With particular reference to FIGS. 7 and 3, electric power is supplied to the cooking appliance through a manually actuated double poll switch 26 connected to lines 28 and 30 of a conventional electric cord adapted to be plugged into an ordinary electrical outlet. Upper heating elements 22 and lower heating elements 24 are connected in a parallel circuit relationship as shown in FIG. 7.

The control components of the oven toaster are supported on a generally rectangular mounting plate 32 which forms a lower front wall of the cooking chamber 2 below food rack 4. As shown, the main switch 26 includes a pair of contacts 36, 38 and a pair of movable contacts 40, 42 all of which are supported on an insulating block 44 which is attached to the mounting plate 32. As shown more particularly in FIGS. 3, 6 and 7, the movable contacts 40, 42 are mounted on a pair of resilient blades 46, 48 which normally hold the movable contacts 40, 42 in an open position with respect to the contacts 36, 38.

A main switch operating mechanism including an actuating block 60 formed of insulating material is positioned above the switch blades 46, 48 for moving the blades downwardly to close the main switch. As shown, the actuating block 60 is attached to an arm 56 of an operating lever 50 by a rivet 62 or other suitable connecting means. The operating lever 50 includes a generally horizontal arm 52 which is positioned behind the mounting plate 32 and is pivoted thereto at 54. As shown, the arm 56 of the lever extends forwardly through a slot 58 which is formed in the mounting plate. The switch actuating lever 50 including its insulated block 60 may simply rest on the upper switch blades 46, 48 without moving them to their closed position, or as shown in the embodiment illustrated, a spring 66 may be provided for holding the switch operating lever 50 in its upper position. The spring 66 is connected at one end to plate 32 through an aperture 67, passes on top of a tab 140 of plate 32 and then under lever 50 to urge the lever upwardly.

As shown more particularly in FIGS. 1 and 8, the control components of the oven toaster are covered by a control panel 70 which includes an upper wall 72 and a depending front wall 74. The panel is located below the front door handle 20 and cooperates with the control mounting plate 32 to suitably house the control components below the door 14 and in front of the cooking chamber 2.

A unique arrangement is provided for actuating the main switch actuating block 60. As shown in FIGS. 1 and 8, a generally rectangular aperture 80 is formed in the upper wall 72 of the control panel and a push button 82 is positioned within the aperture directly above the switch operating arm 56 and its insulated block 60. A finger 84 is integrally formed with the push button for contacting the upper surface of the operating arm 56 to move the block 60 downwardly to close the switch contacts when the push button is depressed.

A uniquely formed guide 86 is provided for slidably guiding the push button and for preventing inadvertent operation of the button. As shown in FIG. 8, the guide member 86 may be formed from suitable plastic material and may be riveted at 88 to the upper wall of the panel. As shown, the guide 86 extends through the aperture 80, and it includes a rear wall 92 and side walls 94, 96 which extend upwardly to the upper surface 98 of the push button. A front wall 100 of the guide member is lower than the side and rear walls of the guide member to enable the push button to be more readily actuated by a finger of a user of the appliance. With this construction it can be appreciated that the push button is substantially enclosed in at least three sides so that the main switch cannot be inadvertently actuated. In order to suitably hold the push button and prevent it from falling off the oven toaster should the toaster be turned upside down, a plurality of fingers 102, 104 are formed on the push button for suitable engagement with the underside surface 106 of the guide member 86. It can be appreciated that the fingers 102, 104 include outwardly extending surfaces 108 for contacting the underside surface 106 of the guide member 86.

Figure 2:
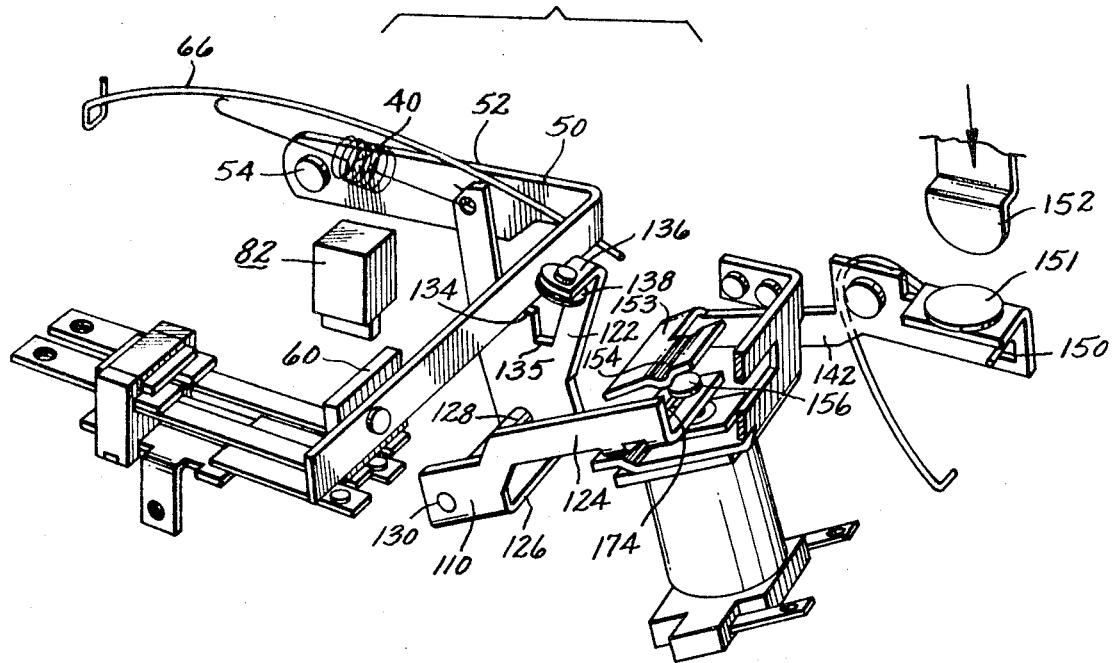
FIG. 2 is a fragmentary exploded perspective view showing my improved simplified control mechanism.
Figure 4:
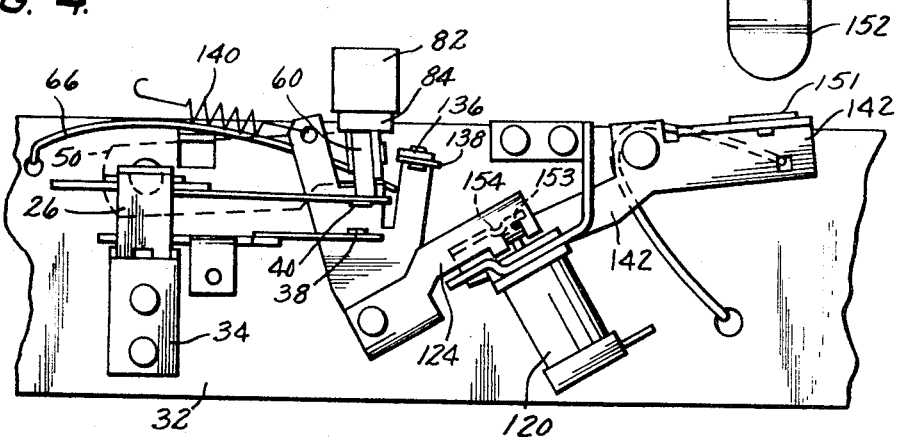
FIG. 4 is a fragmentary front elevational view of the control mechanism illustrating the positions of the parts with the door open and the latch stop member preventing the switch operating arm from being moved to its switch closed position.

A movable member 110 in the form of a pivoted lever having a plurality of arms is provided for cooperation with a door lever and a solenoid to prevent operation of the main switch 26 until the door 14 is closed and for permitting a solenoid 120 to open the switch at the end of a toasting or cooking cycle. As shown more particularly in FIGS. 2 and 3, the movable member 110 is generally U-shaped and includes a rear wall 122, a front wall 124, and a bight wall portion 126. A suitable pivot pin 128 extends through an aperture 130 formed in the front wall, and an aperture 132 formed in the rear wall, and is suitably riveted to the mounting plate 32 for pivoting the movable member 110 on the mounting plate. The rear wall portion 122 of the movable member includes a stop or abutment surface 134 for preventing downward movement of the switch operating arm 56 when the door is in its open position as shown in FIGS. 2 and 4. The rear portion of the movable member 110 also includes a latch surface 136 for holding the switch in a closed position until the door 14 is opened or the solenoid 120 is energized. In the preferred embodiment the latch surface 136 is provided by a washer 138 which may be suitably riveted to the movable member in order to permit smooth sliding contact with the upper surface of the switch operating arm 56.

A tension spring 140 is suitably attached to an upper portion of the movable member 110 and a tab 141 on the support plate 32 for urging the movable member 110 in a counterclockwise direction, while a spring loaded door lever 142 is provided for overpowering the spring 140 to move the movable member 110 in a clockwise direction when the door is in its open position. As shown in FIG. 3, the door lever 142 is mounted on the support plate 32 by a pivot 144 and is urged in a counterclockwise direction against the front arm 124 of the movable member by a torsion spring 146 which has one end inserted within an aperture 148, support plate and the other end in an aperture 150 of the door lever. With particular reference to FIG. 4, it can be seen that the door lever 142 includes an upper-right surface having a button 151 for cooperation with a depending tab 152 which is fixed to the door 14 below its handle 20. It can also be seen that the door lever 142 includes a forwardly extending left-side surface 153 having a depressed portion 154 for contacting the front arm 124 of the movable member 110 and the top 156 of a solenoid core 158.

Figure 5:
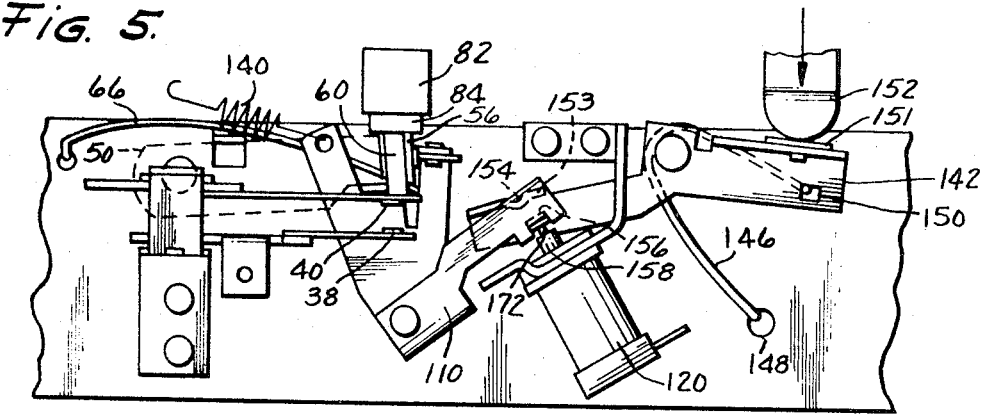
FIG. 5 is a fragmentary front elevational view similar to FIG. 4 showing the door closed and the main switch open.

With the construction thus far described, when the door 14 is moved to its closed position illustrated in FIGS. 1 and 5, the door tab 152 presses downwardly on the button 151 to rotate the door lever 142 in a clockwise direction against the force of its torsion spring 146. Thus, the left side 153 of the door lever is lifted with respect to the right side of the movable member 110 to thereby permit the movable member 110 to be rotated counterclockwise by tension spring 140 to the position illustrated in FIG. 5. In this position the latch washer 138 abuts the right-side surface of the switch operating arm 56 and the switch operating arm 56 is located above a notch 135 which is formed in the movable member 110 below stop surface 134. Accordingly, the push button 82 may be depressed from the position illustrated in FIG. 5 to the position illustrated in FIG. 6 to close the switch contacts 36, 38, 40, 42. During this movement the downwardly extending finger 84 of the push button engages the switch operating member 56 to move the switch insulating block 60 downwardly against the movable switch blades 46, 48 to close the switch.

Figure 6:
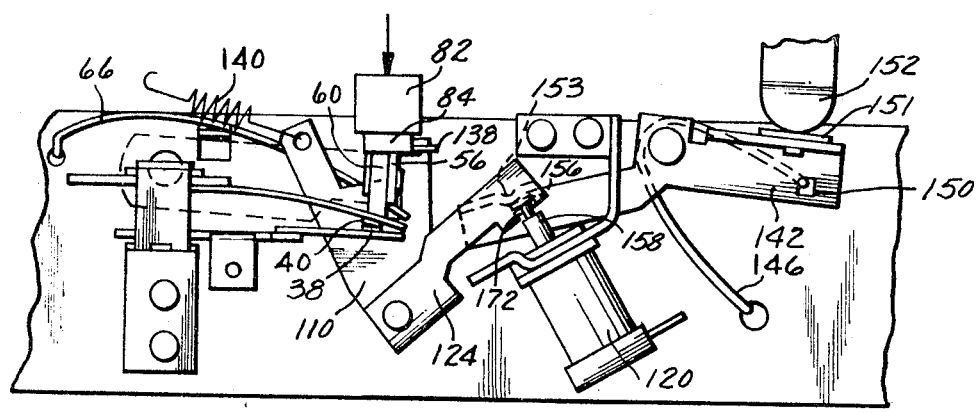
FIG. 6 is a fragmentary front elevational view similar to FIG. 4 showing the door closed and the main switch being closed by the push button at the start of a cooking cycle.

With particular reference to FIGS. 3, 5 and 6, it can be appreciated that as the switch operating arm 56 is moved downwardly from the position illustrated in FIG. 5 to the position illustrated in FIG. 6, the washer 138 of the movable member 110 slides on the right-side surface of arm 56 under the force of spring 140. Thus, upon continued downward movement of the block 60 and its arm 56 the washer 138 is moved on top of the lever 56 under the force of spring 140 as soon as the lever 56 is moved below the washer 138. Accordingly, when the manual downward force on push button 82 is released the washer 138 cooperates with the top surface of lever 56 to hold the switch contacts in the switch closed position illustrated in FIG. 6 against the force of switch blades 46, 48 and spring 66.

A solenoid 120 including a coil 166 and a movable core 158 is uniquely combined with the aforedescribed movable latch member 110 and door lever 142 for automatically opening the switch contacts 36, 38, 40 and 42 at the end of a cooking cycle. With particular reference to the circuit diagram illustrated in FIG. 7 and the overall control mechanism shown in FIG. 3, it can be appreciated that when the solenoid coil 166 is energized at the end of a toasting cycle the core 158 will be pulled downwardly into the coil 166.

As shown more particularly in FIGS. 2, 4, 5 and 6, the top portion of the solenoid core 158 is loosely connected to the forward right arm 124 of the movable latch member 110 by means of an annular groove 172 which is formed at the upper portion of the solenoid core and a rearwardly extending slot 174 which is formed in the arm 124 of the movable latch member 110. Accordingly, at the end of a toasting cycle when the solenoid is energized the parts are moved from their positions illustrated in FIG. 6 to the positions illustrated in FIG. 5. It can be seen that the solenoid pulls the forward right portion of the movable latch member 110 downwardly against the force of spring 140 to rotate the movable latch member in a clockwise direction to release the washer latch 138 from the upper surface of lever 56. Upon release of the lever 56 the lever and its insulated switch actuating block 60 are moved upwardly under the force of the switch blades 40, 42 and spring 66 to open the main switch contacts 36, 38, 40 and 42.

The solenoid core 158 is also arranged to directly cooperate with the door lever 142 and its spring 146 so that the solenoid core and the movable latch member 110 to which it is connected is held in the main switch open position. To achieve this, the left-side portion of the door lever 153 is provided with a depressed portion 154 for smooth slidable cooperation with the upper surface 156 of the solenoid core, and as previously described, since the force of spring 146 is greater than the force of spring 140, when the door is moved from its closed position illustrated in FIG. 5 to its open position illustrated in FIG. 4, the spring 146 moves the door lever 142 in a counterclockwise direction to cause the depression 154 to abut the upper surface of the solenoid core 156 to move the solenoid core and the latch lever 110 in a clockwise direction against the force of spring 140.

With particular reference to FIGS. 4 and 2, it can be appreciated that when the door is opened to permit spring 146 to move the door lever 142 in a counterclockwise direction and the movable latch member 110 in a clockwise direction, the abutment surface 134 on the rear wall of the movable latch member is moved under the lever 56. In this position illustrated in FIGS. 2 and 4, the abutment stop surface 134 of the movable latch member is positioned immediately below the switch operating arm 56, and thus prevents downward movement of the push button 82 and the switch operating member 56 to close the main switch while the door is in its opened position.

While any suitable device may be used for energizing the solenoid 120 at the end of a toasting time period in the preferred embodiment illustrated in FIGS. 3 and 7, a heat responsive bimetal control device 158 is utilized. The heat responsive member 158 flexes somewhat downwardly and inwardly to move a control rod 170 forwardly at the end of a cooking or toasting cycle to open switch contacts 162 and 164 at the end of the cycle. With particular reference to FIG. 7, it can be appreciated that when the contacts 162 and 164 are in their open position current may flow through the solenoid coil 156 to thereby energize the solenoid and move its core downwardly. The details of the arrangement for opening the switch contacts 162 and 164 at the end of a toasting or cooking cycle do not form a part of this invention and are described and illustrated in greater detail in the prior patents to Loch No. 3,086,511 and Loch et al. No. 3,119,000, both assigned to the same assignee as the present invention.

From the foregoing discussion it can be appreciated that the solenoid and its core member 158 is uniquely positioned and related to both the door lever 142 and the movable latch member 110 so that it directly cooperates with these parts without the use of complicated intermediate levers and members. Thus, the solenoid core can directly open the main switch at the end of a toasting time period without any interference from the door lever 142 which is positioned above the core 158 and arm 124 of the latch lever in its clockwise position illustrated in FIGS. 5 and 6. However, when the door is opened, as illustrated in FIG. 4, the solenoid core and the movable latch member 110 are over powered by the door lever and its spring 146 to prevent the main switch for being actuated when the door is in its open position. Accordingly, an improved low cost control mechanism for an electric oven toaster having relatively few parts which may be easily manufactured and assembled to each other to reliably control operation of an oven toaster has been achieved.

What I claim is:
1. An electric cooking appliance comprising:
   a. wall means forming a cooking chamber having a front opening;
   b. a door for closing said front opening;
   c. a horizontal food supporting rack located in said cooking chamber;

d. electric heating means mounted in said chamber and spaced from said rack;

e. first electrical switch means having normally open contacts connected in series electric circuit relationship with said heating means for energizing said heating means when said first switch means is in its closed position;

f. a switch operating member for moving said switch to its closed position;

g. a movable latch member having a latch surface for holding said switch operating member in a switch closed position;

h. an electrical control means for controlling a cooking period;

i. a solenoid including an electrical solenoid coil and a movable core member, said core member being directly connected to said movable latch member for moving said member to release said switch operating member from said latch surface to thereby permit said switch to be moved to its open position upon energization of said solenoid; and j. second electrical switch means connected in electric circuit relationship with said solenoid and operably connected to said control means for operating said second switch to energize said solenoid upon movement of said control means at the end of a cooking period.

2. An electric cooking appliance as defined in claim 1 wherein said movable latch member includes an arm having a slot formed therein and said solenoid core includes a reduced portion for receiving said slot between the core main body portion and its head portion for directly connecting said solenoid core to said movable member.

3. An electric cooking appliance comprising:

a. wall means forming a cooking chamber having a front opening;

b. a door for closing said front opening;

c. a horizontal food supporting rack located in said cooking chamber;

d. electric heating means mounted in said chamber and spaced from said rack;

e. an electrical control means for controlling a cooking period;

f. first electrical switch means having normally open contacts connected in series electric circuit relationship with said heating means for energizing said heating means when said first switch means is in its closed position;

g. a switch operating member for moving said switch to a closed position;

h. a movable latch member having a latch surface for holding said switch operating member in a closed position and a stop surface for preventing said switch operating member from closing said switch contacts;

i. a solenoid including an electrical solenoid coil and a movable core member, said core member being directly connected to said movable latch member for moving said latch surface to release said switch operating member from said latch surface to thereby permit said switch to be moved to its open position upon energization of said solenoid;

j. second electrical switch means connected in electric circuit relationship with said solenoid and operably connected to said control means for operating said second switch to energize said solenoid upon movement of said control means at the end of a cooking period;

k. a door lever pivotally mounted on said cooking appliance between said door and said movable latch member;

l. spring means connected to said door lever for moving said door lever in a direction to move said movable member to release said latch surface from said switch operating member to open said first switch means; and m. an actuating member connected to said door for moving said door lever against the force of said spring means for preventing said door lever from opening said first switch means.

4. An electric cooking appliance as defined in claim 3 wherein said movable latch member includes an outwardly extending arm having a slot formed therein and said solenoid core includes a reduced portion for receiving said slot for directly connecting said solenoid core to said movable member, and said door lever includes an arm for abutting an upper surface of said solenoid core for moving said movable latch member to thereby open said first switch means when the door is moved to its open position.

5. An electric cooking appliance as defined in claim 4 wherein a second spring is connected to said movable latch member for moving said movable latch member in a counterclockwise direction for engaging said switch operating arm with said latch surface, and said solenoid core is directly connected to said movable member for moving said member against the force of said second spring means to open the first switch means and position the switch operating arm on top of the stop surface of said movable member.

6. An electric cooking appliance as defined in claim 5 wherein the force applied to said movable latch member by said door lever spring means is greater than the force applied to said movable member by said second spring means so that when the door is in its open position the door lever abuts the upper surface of the solenoid core to move said movable member to release the latch surface of the movable member from said switch operating arm to open said first switch means.

7. An electric cooking appliance as defined in claim 6 wherein a coil of said solenoid coil is located below the outwardly extending arm of the movable latch member, the solenoid core extends upwardly from the solenoid coil and is directly connected to the outwardly extending arm of said movable latch member, and the door lever includes an arm which is positioned above the outwardly extending arm of the movable latch member so that the arm of said door lever abuts the upper surface of the solenoid to move the solenoid core downwardly and move the movable latch member in a clockwise direction to open the switch contacts.

8. An electric cooking appliance comprising:

a. wall means forming a cooking chamber having a front opening;

b. a door for closing said front opening;

c. a control panel including an upper wall located below said door and in front of said cooking chamber;

d. a horizontal food supporting rack located in said cooking chamber;

e. electric heating means mounted in said chamber and spaced from said rack;

f. first electrical switch means having normally open contacts connected in series electric circuit relationship with said heating means for energizing said heating means when said first switch means is in its closed position;
g. a switch operating member for moving said switch to its closed position;
h. a movable latch member having a latch surface for holding said switch operating arm in a switch closed position and a stop surface for preventing said switch operating arm from closing said switch contacts;
i. an aperture formed in the upper wall of said control compartment above said switch operating arm; and
j. a push button positioned in said aperture on top of said switch operating member for moving said switch operating member downwardly to close the first switch contacts.

9. An electric cooking appliance as defined in claim 8 wherein a guide member formed of plastic electrical insulating material is positioned within said aperture for guiding said push button, said guide member including a plurality of walls extending upwardly from the upper wall of the control compartment for partially surrounding said push button to thereby prevent it from being accidentally actuated.

10. An electric cooking appliance as defined in claim 8 wherein said push button is formed of plastic insulating material and includes a generally centrally positioned downwardly extending finger for engagement with an upper surface of the switch operating member.

11. An electric cooking appliance as defined in claim 10 wherein said push button includes a plurality of outwardly extending fingers for limiting upward movement of said push button.

\* \* \* \* \*

UNITED STATES PATENT AND TRADEMARK OFFICE
CERTIFICATE OF CORRECTION

PATENT NO. : 3,752,955
DATED : August 14, 1973
INVENTOR(S) : Lawrence L. Grove

It is certified that error appears in the above—identified patent and that said Letters Patent is hereby corrected as shown below:

In the drawings, Fig. 7 should appear as shown below:

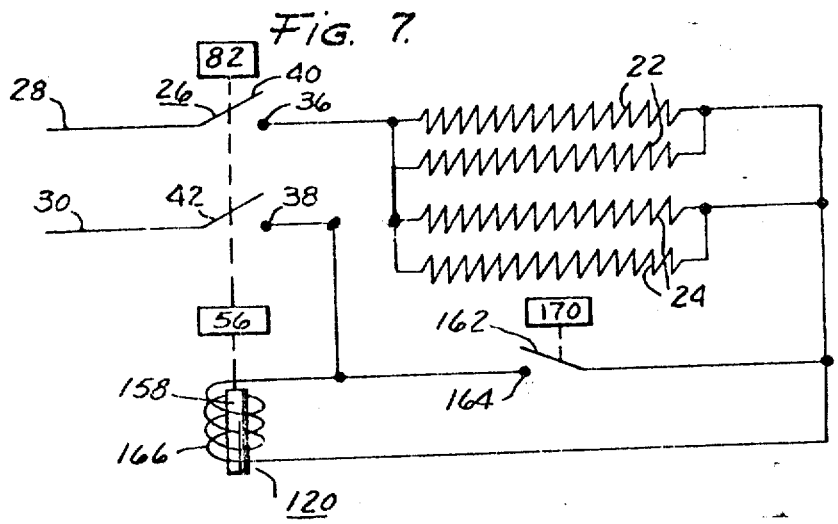

Signed and Sealed this

Second Day of February 1982

[SEAL]

Attest:

GERALD J. MOSSINGHOFF

Attesting Officer    Commissioner of Patents and Trademarks